(12) United States Patent
Haynes

(10) Patent No.: US 6,574,671 B1
(45) Date of Patent: Jun. 3, 2003

(54) GRANULAR ASSIGNATION OF IMPORTANCE TO MULTIPLE-RECIPIENT ELECTRONIC COMMUNICATION

(75) Inventor: Thomas Richard Haynes, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/260,934

(22) Filed: Mar. 2, 1999

(51) Int. Cl.[7] ............................................. G06F 15/16
(52) U.S. Cl. .................................................. 709/245
(58) Field of Search ................................ 709/201, 206, 709/207, 245; 358/400

(56) References Cited

U.S. PATENT DOCUMENTS

| | | | | |
|---|---|---|---|---|
| 5,689,642 A | * | 11/1997 | Harkins et al. | 709/207 |
| 5,694,616 A | * | 12/1997 | Johnson et al. | 395/860 |
| 5,754,306 A | * | 5/1998 | Taylor et al. | 358/400 |
| 6,192,396 B1 | * | 2/2001 | Kohler | 709/206 |
| 6,327,612 B1 | * | 12/2001 | Watanabe | 709/206 |

* cited by examiner

*Primary Examiner*—Glenton B. Burgess
*Assistant Examiner*—Tod Kupstas
(74) *Attorney, Agent, or Firm*—Bracewell & Patterson, LLP; John D. Flynn

(57) ABSTRACT

A method for distinguishing recipients of electronic communication on a data processing system utilizing the recipient's electronic addresses. Electronic communication is first addressed to at least two recipients with corresponding recipient addresses. Then specific characteristics, from among a plurality of characteristics, are linked to one or more of the recipient addresses, wherein the characteristic serves to distinguish the recipient's communication from the communication of other recipients. When the communication is sent the recipient receives his communication along with the characteristics assigned it.

20 Claims, 4 Drawing Sheets

GRANULAR ASSIGNATION OF IMPORTANCE TO MULTIPLE-RECIPIENT ELECTRONIC COMMUNICATION

BACKGROUND OF THE INVENTION

1. Technical Field

The present invention relates in general to an improved data processing system, and in particular to a method and system for enhanced communication by a user of a data processing system. Still more particularly, the present invention relates to a method and system for enhanced communication by a user of a data processing system, wherein outgoing communication is marked with preselected characteristics.

2. Description of the Related Art

Electronic document transfer and message communication such as electronic mail, are well known in the art. With the fast evolving global electronic network following the opening up of world-wide communication channels such as the Internet or World Wide Web, transmission of data and non-data communication via electronic means on a data processing system network is becoming more and more common.

E-mail communication makes up a significant and fast growing portion of the communications environment which exists on the Internet. More and more users globally are communicating via e-mail which is considerably cheaper than regular telephone network or other related communication systems. Similarly, file and document transfer via file transfer protocol (FTP) is becoming increasingly popular.

Users of the Internet are provided with a user address which serves as an electronic mail box. A user is able to create an electronic communication and transmit it to one or more other users via their respective user address. Messages are thus capable of being transmitted to a plurality of recipients, simultaneously. This is usually accomplished when the sender or originator of the communication enters the respective addresses of each desired recipient in the "addressing" location of the software being utilized to transmit the document.

FIG. 1 depicts a prior art representation of a graphical user interface (GUI) 101 of Lotus Notes program (Lotus Notes is a Trademark of International Business Machines, Inc. (IBM) assignee of the present invention). Lotus Notes GUI 101 consists of pull down menu buttons 103A, menu bars 103B, and a visual display area 105. Within visual display area 105, is depicted a electronic communication comprising of an addressing area ("To", "cc", "bc", and "subject") 107, a security area 108 and a level of importance selection area 109. Below these is the text of message 111.

In today's electronic mail environments, when a user creates a note to be sent to one or more recipients, he usually is given an option to select the communication as belonging to a certain level of "importance". For instance, Lotus Notes offers three choices: "Urgent" 110A, "Normal" 110B, and "FYI" 110C. The assignment selected is applied to all recipients of the note, regardless of classification ("To", "cc", or "bcc").

A note sender might very well want to assign different importance levels to different recipients. For instance, one might want a note to be of "Urgent" importance to one set of recipients, but "Normal" to and "FYI" to yet another subset.

Currently, to assign different levels of importance to subgroups of recipients, the sender must send out the same document more than once—each time, to the recipients identified for the importance level desired. For example, the sender sends a note first to Sam and Mary at importance "Urgent", then sends the same note out to Joe and Jill at importance "Normal". There is no simple way of doing this today.

It would therefore be desirable to have a method and system for individually assigning a level of importance to each recipient of an electronic document. It would be further desirable to have a method for assigning particularized characteristics to each of a plurality of recipients of an electronic communication.

SUMMARY OF THE INVENTION

It is therefore one object of the present invention to provide an improved data processing system.

It is another object of the present invention to provide a method and system for enhanced communication by a user of a data processing system.

It is yet another object of the present invention to provide a method and system for enhanced communication by a user of a data processing system wherein outgoing communication is marked with preselected characteristics.

The foregoing objects are achieved as is now described. A method is disclosed for distinguishing recipients of electronic communication on a data processing system utilizing the recipient's electronic addresses. Electronic communication is first addressed to at least two recipients with corresponding recipient addresses. Then specific characteristics, from among a plurality of characteristics, are linked to one or more of the recipient addresses, wherein the characteristic serves to distinguish the recipient's communication from the communication of other recipients.

In the preferred embodiment, implemented in an e-mail environment, linking the characteristics is completed by first selecting one or more recipient e-mail addresses, then choosing the characteristic desired to be linked to the e-mail communication of the recipient. The chosen characteristic is linked with the e-mail communication being sent via the recipient's address. When the communication is sent, the recipient receives his communication along with the characteristics assigned, to it.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
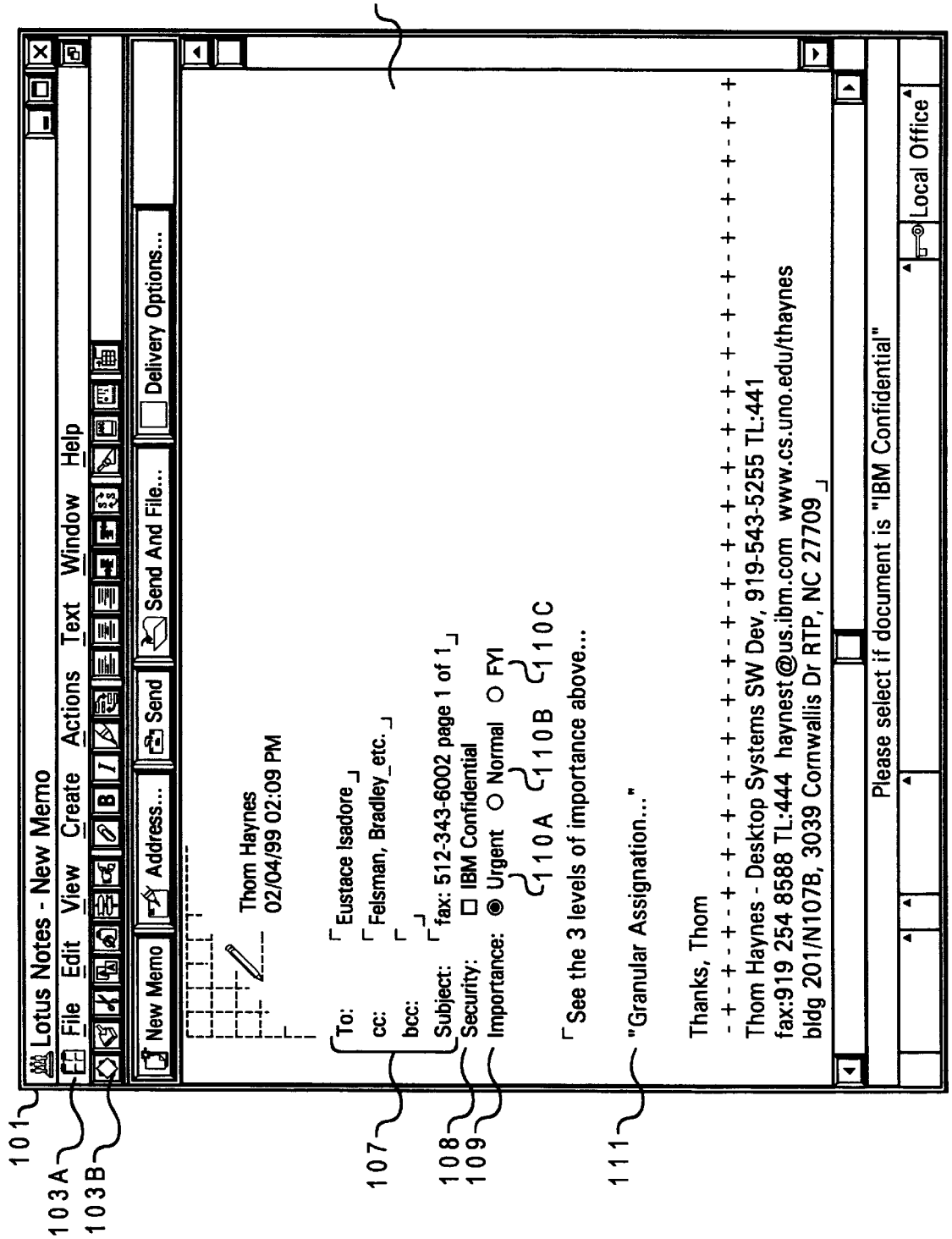
FIG. 1 is a prior art diagram of a Lotus Notes™ graphical user interface.
Figure 2:
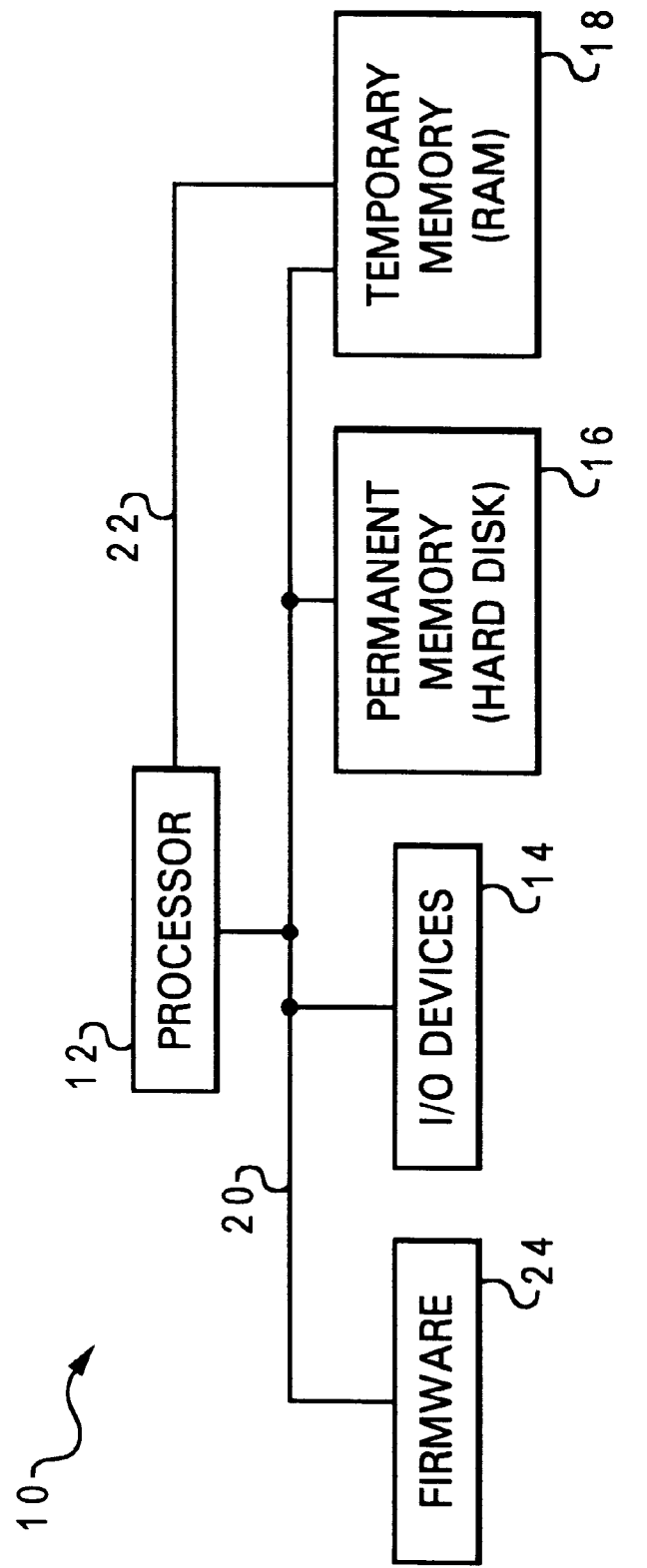
FIG. 2 is a diagram of a data processing system utilized in the preferred embodiment of the present invention.

With reference now to the figures, and in particular with reference to FIG. 2, there is depicted the basic structure of a data processing system 10 utilized in the preferred embodiment of the invention. Data processing system 10 has at least one central processing unit (CPU) or processor 12 which is connected to several peripheral devices, including input/output devices 14 (such as a display monitor, keyboard, and graphical pointing device) for user interface, a permanent memory device 16 (such as a hard disk) for storing the data processing system's operating system and user programs/applications, and a temporary memory device 18 (such as random access memory or RAM) that is utilized by processor 12 to implement program instructions. Processor 12 communicates with the peripheral devices by various means, including a bus 20 or a direct channel 22 (more than one bus may be provided utilizing a bus bridge).

Data processing system 10 may have many additional components which are not shown such as serial, parallel, and universal serial bus (USB) ports for connection to, e.g., modems or printers. In the preferred embodiment of the invention, communication to and from the data processing system is made possible via a modem connected to a land line (telephone system) which is in turn connected to a network provider such as an Internet service provider (ISP). Additionally or alternatively, data processing system may be connected to a local area network (LAN) via an ethernet/network card. Communicated data is transmitted via and arrives at the modem or network card and is processed to be received by the data processing system's CPU or other software application.

Those skilled in the art will further appreciate there are other components that might be utilized in conjunction with those shown in the block diagram of FIG. 2; for example, a display adapter connected to processor 12 might be utilized to control a video display monitor, and a memory controller may be utilized as an interface between temporary memory device 18 and processor 12. Data processing system 10 also includes firmware 24 whose primary purpose is to seek out and load an operating system from one of the peripherals (usually permanent memory device 16) whenever the data processing system is first turned on. In the preferred embodiment, data processing system contains a relatively fast CPU 12 along with sufficient temporary memory device 18 and space on permanent memory device 16, and other required hardware components necessary for providing hardware support to electronic communication capabilities.

Conventional data processing systems often employ a graphical user interface (GUI) to present information to the user. The GUI is created by software that is loaded on the data processing system, specifically, the data processing system's operating system acting in conjunction with application programs. Two well-known GUIs include OS/2 (a trademark of International Business Machines Corp.) and Windows (a trademark of Microsoft Corp.), which can be utilized with the present invention.

This invention implements a method and system for individually assigning a level of importance to a plurality of recipients of an electronic communication. For the purposes of this invention, electronic communications include (by way of example and without limitation) e-mail messages, files transmitted via file transfer protocol (FTP), Internet/web pages, chat or newsgroup communications, and terminal emulation. Those skilled in the art recognize that this list may include other forms of electronic communication similar to those listed above.

The implementation of the present invention occurs on the data processing system described above, loaded with a software application containing a program algorithm which permits individual selection of addresses and individual assignments of level of importance for electronic communications. In the preferred embodiment of the invention, implemented in an e-mail environment, the data processing system is equipped with an e-mail engine, such as Eudora by Qualcomm, Inc. The engine is resident software for creating, receiving, displaying and manipulating e-mail messages. It provides options to create and address new mail messages. The messages are transmitted via an outgoing server utilizing Simple Mail Transfer Protocol (SMTP). Those skilled in the art are familiar with the workings of an e-mail engine. An e-mail message is routed to a Post Office Protocol (POP) server on which the mail is stored until accessed by the recipient. When the recipient logs into his mail account utilizing an e-mail engine, and connects to the POP server, the incoming e-mail messages are downloaded into the recipient's data processing system into the e-mail engine's In-box. In the preferred embodiment, the recipient receives a tag which indicates the level of priority assigned to the e-mail by the sender. In a more generalized embodiment, the e-mail message is displayed or marked with particular characteristics selected by the sender of the message.

For the purposes of the invention, a recipient is described as anyone to whom an originator of an electronic communication selects to receive the electronic communication. Further, the recipient is represented by a corresponding recipient address. Those skilled in the art understand the allocation of electronic addresses to users of an electronic communication transfer environment. For the purpose of the invention, the term recipient and recipient address shall be understood to refer to the recipient and utilized interchangeably. During implementation of the invention, the changes made to the communication of a particular recipient are linked to the recipient via the recipient's address. This change or selection of characteristics to apply to the recipient address affects the way the communication is sent to that particular recipient or what occurs to the communication sent to that recipient. For example, a recipient's communication may be tagged/marked "urgent" while in the recipient's In-box if the recipient's address was linked to that characteristic by the sender before transmitting the communication. Additionally, a recipient's communication may be encoded based on the sender selecting that characteristic to link to the recipient's address.

During implementation of the preferred embodiment of the invention, the sender selects one from among a plurality of importance choices, to assign one or more specified recipient of the communication via the recipients' addresses. In a first implementation, the sender first selects a global choice which is applied to every recipient address. The sender may then select particular ones of the recipient addresses and modify the respective choice for each. For example, the communication would be labelled as urgent for every recipient address. The sender then selects particular recipients via their addresses and labels those selected recipients with an "FYI" classification.

In one possible implementation utilizing a data processing system with a pointing device (e.g., a mouse), the sender right-clicks with the pointing device (usually a mouse) in the "To", "cc", or "bcc" field, on the address of the recipient whose importance value would differ from the global choice. This causes the recipient address to be highlighted and permits the sender to select a different value to apply.

Alternatively, the sender could select multiple recipients by any of a variety of common GUI techniques, as those skilled in the art will recognize, such as marquee selection, and drag/swipe selection. The chosen classification then applies to all selected.

In the preferred embodiment, utilizing standard operations of a mouse connected to a data processing system, clicking right-button causes a context (pop-up) menu to appear. The selections in the menu consist of a cascading menu item called importance, with a plurality of choices including for example, "Urgent", and "FYI" (other levels of importance may be defined if desired). The sender may chose a different value than the global choice. This selected value is then applied and those selected recipients would have that different value of importance. In the preferred embodiment, indication (feedback) of this difference would be presented to the sender. This feedback is completed in one of a number of ways including font manipulation (bold, italics, etc.) and color-coded representation. In font manipulation, each font represents a particular characteristic and similarly in color-coded representation.

In the preferred embodiment, when the sender sends the document, and it is received in the In-box of a recipient, the list of addresses do not indicate to the recipient that there were any modifications from the global choice (that is, for example, all textual addresses for all addressees would be the same color or font).

In another embodiment of the invention, distribution lists are handled similarly. The e-mail system is enhanced to allow the sender to work with the individual addresses that comprised the distribution list. The sender may then select particular addresses and link those addresses to particular characteristics. The distribution list is then stored with the characteristics linked to the corresponding addresses.

In yet another embodiment of the invention, a less granular way to provide capability allows the sender to assign different levels of importance based not on individual recipients, but rather on the type of recipient field. In this embodiment, for instance, the sender indicates that every recipient in the "cc" list should be marked "Normal", and every recipient in the "bcc" list should be marked "FYI". Additionally, this characteristic may be assigned at a group level when mail address groups are utilized. In this embodiment, a particular group represents a particular characteristic and placing a recipient's e-mail address in that group results in that characteristic being automatically applied to the e-mail address.

Figure 3:
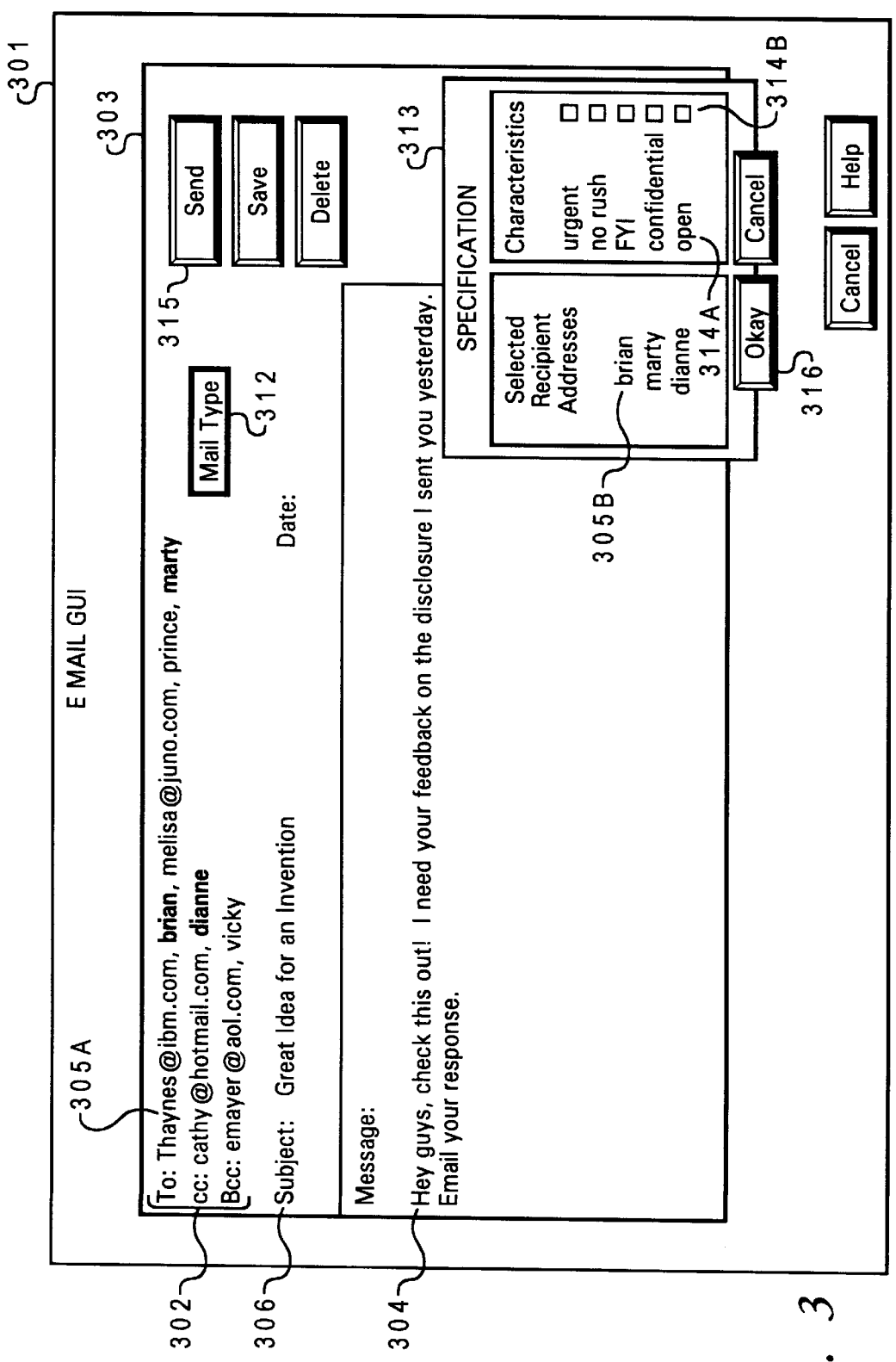
FIG. 3 is a block diagram of a electronic communication environment GUI in accordance with one embodiment of the present invention.

In one illustrative embodiment in which e-mail communication is received by the user on an e-mail engine, a series of steps necessary to implement the invention are disclosed. The e-mail engine is created by software resident on the data processing system. The e-mail engine typically consists of GUIs which provide a display area and a number of options for user interface. FIG. 3 depicts an e-mail GUI 301 according to the preferred embodiment and shows how the invention may be implemented. Specifically, it depicts how the interface is augmented to include an individual priority assignment option. E-mail GUI 301 contains typical items for user interface including, a display area 303 divided into two sections, an address section 302 and a message section 304. Address section 302 contains the list of recipient addresses 305A in one of a three categories "To:", "cc:", and "bcc:". Recipient addresses 305A are manually entered by the sender of e-mail messages and may contain one or more than one address. In the preferred embodiment, at least two addresses are entered in this section. A subject option 306 is also present below address section 302. E-mail GUI also has mail option buttons 315 to determine what step to take with a created communication. In this embodiment, e-mail GUI 301 is provided with a "mail type" button 312 which is selectable by the sender. Selection of mail type button 312 opens up a "Specification" GUI 313 which contains a list of any selected recipient addresses 305B and a series of possible characteristics 314A which a sender may apply to the communication to those recipients by clicking on the corresponding check boxes 314B. In this embodiment, if no recipient address 305A is preselected, characteristic 314A selected is applied to the entire group of recipients. Selection of check boxes 314B automatically links the corresponding characteristic 314A with pre-selected recipient addresses 305B. The sender closes Specification GUI 313 and applies the characteristics by selecting okay button 316.

In another embodiment of the present invention, a user selects a list of e-mail addresses utilizing a mouse and clicks on the right button to bring up the Specification GUI 313. It is understood by those skilled in the art that variations exist in the embodiments of the present invention but that all these variations fall within the scope of the present invention.

In yet another embodiment of the present invention, a user may apply a particular characteristic to a particular recipient's e-mail address. In this embodiment, the characteristic applies to all future communications to that recipient without having to select the characteristic each time.

In the preferred embodiment, once the sender attaches characteristics to a particular recipient's address, the address is displayed within the e-mail GUI with a color code as described above. In an illustrative color coded scheme, for example, messages marked "urgent" may be displayed in red, "FYI" in green, and "semi-urgent" in blue. It is understood by those skilled in the art that although only three levels are presented in this illustration any number of levels or variations n characteristics may be utilized in the preferred embodiment. Software developer may provide a complex array of choices from which the sender may choose. Further, this array may include additional options not specifically related to levels of importance.

Figure 4:
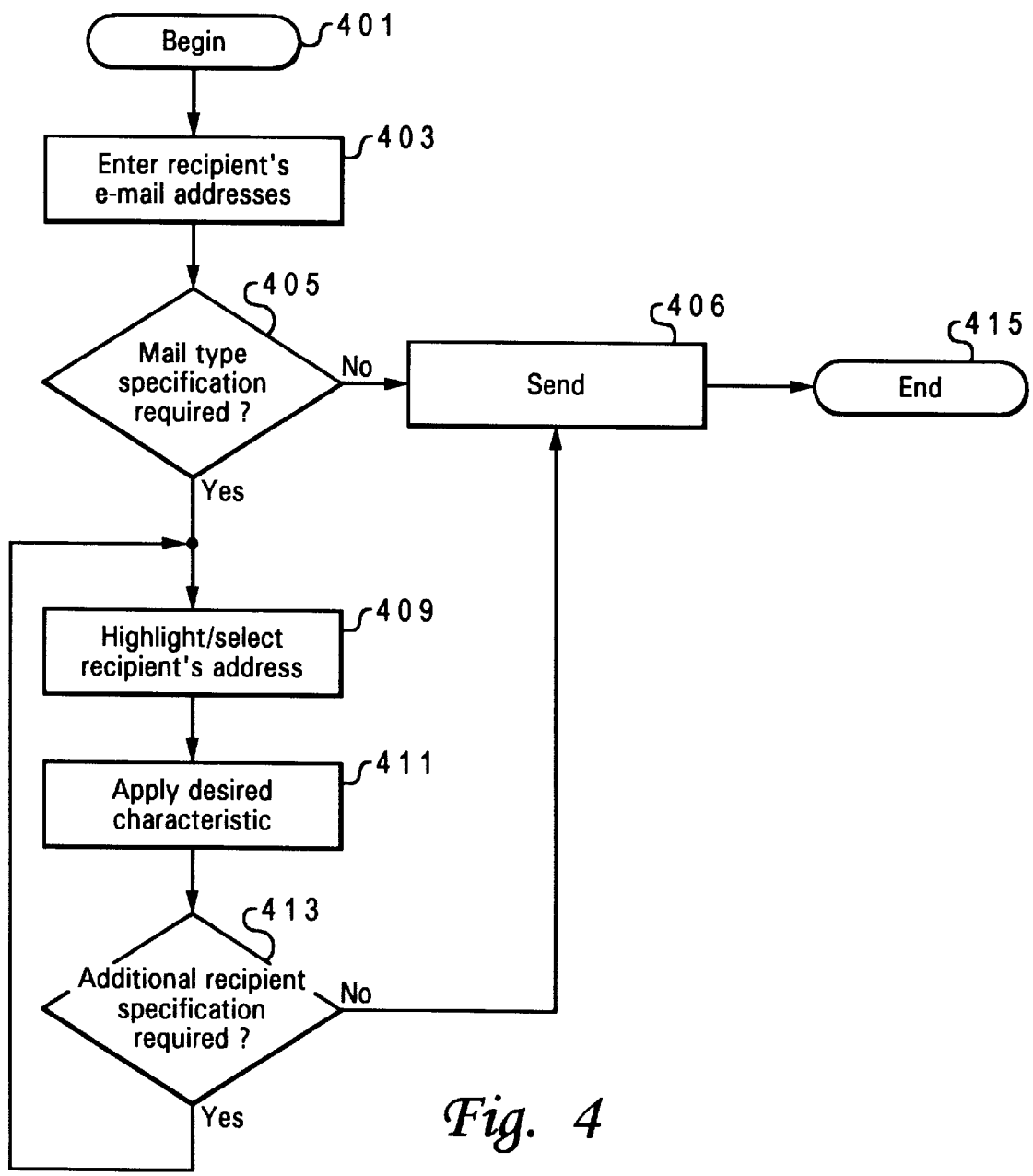
FIG. 4 is a logic flow chart of the process involved in one preferred embodiment of the present invention.

FIG. 4 depicts a flow chart of the process which occurs in a data processing system during the implementation of the invention in an e-mail environment. The process begins (step 401) when a sender decides to send a communication and enters the address(es) of the desired recipients (step 403). A first determination is made as to whether or not the sender desires to set particular characteristics to recipients of the communication (step 405). If the sender does not wish to set particular characteristics, then the communication is sent to the recipients (step 406). If, however, the sender desires to set particular levels of urgency for recipient's communication, then the sender highlights the recipient's address desired (step 409) and applies the desired characteristics (step 411). The sender then determines if he wishes to set characteristics for another recipient (step 413). If so, the sender returns highlight/select the recipient's address (step 409). The process of selecting a recipient address and applying a particular characteristics continues until the sender is completed with the selections and sends the e-mail (step 406). The process then ends (step 415). It is understood that although the selection process described herein is completed one address at a time, the invention contemplates being implemented by selection of multiple address simultaneously.

While the invention has been particularly shown and described with reference to a preferred embodiment, it will be understood by those skilled in the art that various changes in form and detail may be made therein without departing from the spirit and scope of the invention. For example, different types of characteristics besides the urgency of the communication, such as whether to encode or not encode a message, may be desired linked to a particular communication and provided as an option to the sender.

What is claimed is:

1. A method for distinguishing an electronic communication on a data processing system addressed to one or more recipients with a corresponding electronic address, said method comprising the steps of:

addressing said electronic communication to one or more recipients to create a plurality of recipient addresses;

linking a specific characteristic to a selected electronic address associated with one of said plurality of recipients, wherein said specific characteristic distinguishes a content of a copy of said communication transmitted to said selected electronic address and is automatically transmitted within said copy of said communication, which exhibits said characteristic independent of other characteristics exhibited by other copies of said communication transmitted to other recipient addresses, wherein said linking step comprises:

first selecting one or more electronic address from said plurality of recipient addresses;

choosing said characteristic from among a plurality of characteristics to be exhibited within said copy of said electronic communication transmitted to said selected electronic address; and indicating on a display device of said data processing system a selected characteristic of each of said selected electronic addresses; and transmitting said communication to said recipient along with said characteristic to effect a displaying of said characteristic in a received communication at a recipient's end of the transmission.

2. The method of claim 1, wherein said choosing step enables assigning different characteristics to different electronic addresses and said selected characteristic to multiple selected electronic addresses.

3. The method of claim 1, wherein said indicating step further includes the step of manipulating a font of said electronic address to correspond to said characteristic applied to said electronic address, wherein a predetermined font is provided with each characteristic of said plurality of characteristics, and further wherein said electronic address with said characteristic is displayed in the font associated with said characteristic.

4. The method of claim 1, wherein said indicating step further includes the step of color coding said electronic address, wherein a color code is provided with said plurality of characteristics, whereby each color represents a particular characteristic from among said plurality of characteristics and further wherein said electronic address with said characteristic is displayed in the color associated with said characteristic.

5. The method of claim 1, wherein said linking step is implemented within a distribution list of electronic addresses and wherein said characteristics of said electronic addresses within said distribution list are storable along with their respective electronic address.

6. The method of claim 1, wherein said characteristic includes an indication of a level of importance attributable to said communication as related to said recipient and said linking step includes displaying said level of importance within said copy of said communication received by said recipient.

7. The method of claim 6, wherein said electronic communication is an email message being transmitted to a first and a second recipient, and said method further comprising displaying a first level of importance within said communication transmitted to said first recipient with and displaying a second level of importance within said communication transmitted to said second recipient.

8. The method of claim 1, further comprising:

associating particular characteristics with particular addresses; and storing said particular addresses along with other addresses within a distribution list prior to preparation of said communication for transmission.

9. The method of claim 1, further comprising automatically associating a selected characteristic to an address field, such that each address entered into a first address field exhibits said selected characteristic independent of addresses entered into a second address field.

10. A system for distinguishing an electronic communication on a data processing system addressed to one or more recipients with a corresponding electronic address, said system comprising:

means for addressing said electronic communication to one or more recipients to create a plurality of recipient addresses;

means for linking a specific characteristic to a selected electronic address associated with one of said plurality of recipients, wherein said specific characteristic distinguishes a content of a copy of said communication transmitted to said selected electronic address and is automatically transmitted within said copy of said communication, which exhibits said characteristic independent of other characteristics exhibited by other copies of said communication transmitted to other recipient addresses, wherein said linking step comprises:

means for first selecting one or more electronic address from said plurality of recipient addresses;

means for choosing said characteristic from among a plurality of characteristics to be exhibited within said copy of said electronic communication transmitted to said selected electronic address;

means for indicating on a display device of said data processing system a selected characteristic of each of said selected electronic addresses; and means for transmitting said communication to said recipient along with said characteristic to effect a displaying of said characteristic in a received communication at a recipient's end of the transmission.

11. The system of claim 10, wherein said choosing means enables assigning different characteristics to different electronic addresses and said selected characteristic to multiple selected electronic addresses.

12. The system of claim 10, wherein said indicating means further includes means for manipulating a font of said electronic address to correspond to said characteristic applied to said electronic address, wherein a predetermined font is provided with each characteristic of said plurality of characteristics, and further wherein said electronic address with said characteristic is displayed in the font associated with said characteristic.

13. The system of claim 10, wherein said indicating means further includes means for color coding said electronic address, wherein a color code is provided with said plurality of characteristics, whereby each color represents a particular characteristic from among said plurality of characteristics and further wherein said electronic address with said characteristic is displayed in the color associated with said characteristic.

14. The system of claim 10, wherein said linking means is implemented within a distribution list of electronic addresses and wherein said characteristics of said electronic addresses within said distribution list are storable along with their respective electronic address.

15. A computer program product for distinguishing an electronic communication on a data processing system addressed to one or more recipients with a corresponding electronic address, to allow for one recipient's communication to exhibit different characteristics from another recipient's communication, said computer program product comprising:

a compute readable storage medium;

program instructions on said medium for:

addressing said electronic communication to one or more recipients to create a plurality of recipient addresses;

providing a pop-up menu of selectable characteristics responsive to user manipulation; and linking a specific characteristic to a selected electronic address associated with one of said plurality of recipients, wherein said specific characteristic distinguishes a content of a copy of said communication transmitted to said selected electronic address and is automatically transmitted within said copy of said communication, which exhibits said characteristic independent of other characteristics exhibited by other copies of said communication transmitted to other recipient addresses, wherein said program instructions for said linking step comprises instructions for:

first selecting one or more electronic address from said plurality of recipient addresses;

choosing said characteristic from among a plurality of characteristics to be exhibited within said copy of said electronic communication transmitted to said selected electronic address; and indicating on a display device of said data processing system a selected characteristic of each of said selected electronic addresses; and transmitting said communication to said recipient along with said characteristic to effect a displaying of said characteristic in a received communication at a recipient's end of the transmission.

16. The computer program product of claim 15, wherein said program instructions for said choosing step enables assigning different characteristics to different electronic addresses and said selected characteristic to multiple selected electronic addresses.

17. The computer program product of claim 15, wherein said program instructions for said indicating step further includes program instructions for manipulating a font of said electronic address to correspond to said characteristic applied to said electronic address, wherein a predetermined font is provided with each characteristic of said plurality of characteristics, and further wherein said electronic address with said characteristic is displayed in the font associated with said characteristic.

18. The computer program product of claim 15, wherein said program instructions for said indicating step further includes program instructions for color coding said electronic address, wherein a color code is provided with said plurality of characteristics, whereby each color represents a particular characteristic from among said plurality of characteristics and further wherein said electronic address with said characteristic is displayed in the color associated with said characteristic.

19. The computer program product of claim 15, wherein said program instructions for said linking step is implemented within a distribution list of electronic addresses and wherein said characteristics of said electronic addresses within said distribution list are storable along with their respective electronic address.

20. The computer program product of claim 15, wherein said program instructions for providing a pop-up menu includes:

program instructions for detecting a right click operation on said recipient's address; and program instructions for automatically activating a list of available selectable options that may be associated with said communication when transmitted to said recipient.

* * * * *